United States Patent [19]

Martin

[11] 4,334,591
[45] Jun. 15, 1982

[54] TRANSPORTER FOR LOW ENERGY SEISMIC SOURCE

[75] Inventor: Philip N. Martin, Tulsa, Okla.

[73] Assignee: Mapco, Inc., Tulsa, Okla.

[21] Appl. No.: 188,370

[22] Filed: Sep. 18, 1980

Related U.S. Application Data

[63] Continuation-in-part of Ser. No. 963,982, Nov. 27, 1978, Pat. No. 4,223,759.

[51] Int. Cl.³ ............................................. G01V 1/104
[52] U.S. Cl. ..................................... 181/116; 181/114; 181/401; 89/40 L
[58] Field of Search ............... 89/40 L, 1 R; 181/116, 181/117, 119, 121, 401, 113; 166/63; 367/145

[56] References Cited

U.S. PATENT DOCUMENTS

| | | | |
|---|---|---|---|
| 2,203,140 | 6/1940 | Green | 181/116 |
| 2,992,611 | 7/1961 | Felch | 181/116 |
| 3,361,226 | 1/1968 | Szasz | 181/401 |

FOREIGN PATENT DOCUMENTS 944472  3/1974  Canada ............................ 181/113

*Primary Examiner*—Howard A. Birmiel
*Attorney, Agent, or Firm*—Head & Johnson

[57] ABSTRACT

An improved seismic energy source having a base with an opening therethrough and having a gun mounted on the base for firing a projectile to impact on the earth's surface and generate a seismic signal, the improvement including a spatter plate and a flexible diaphragm affixed at its periphery to the base lower end, the diaphragm having an opening through which the projectile fired by the gun passes, the diaphragm serving to keep the base chamber free of compacted soil kicked up when the projectile impacts the earth and to contain and quiet the muzzle blast.

20 Claims, 6 Drawing Figures

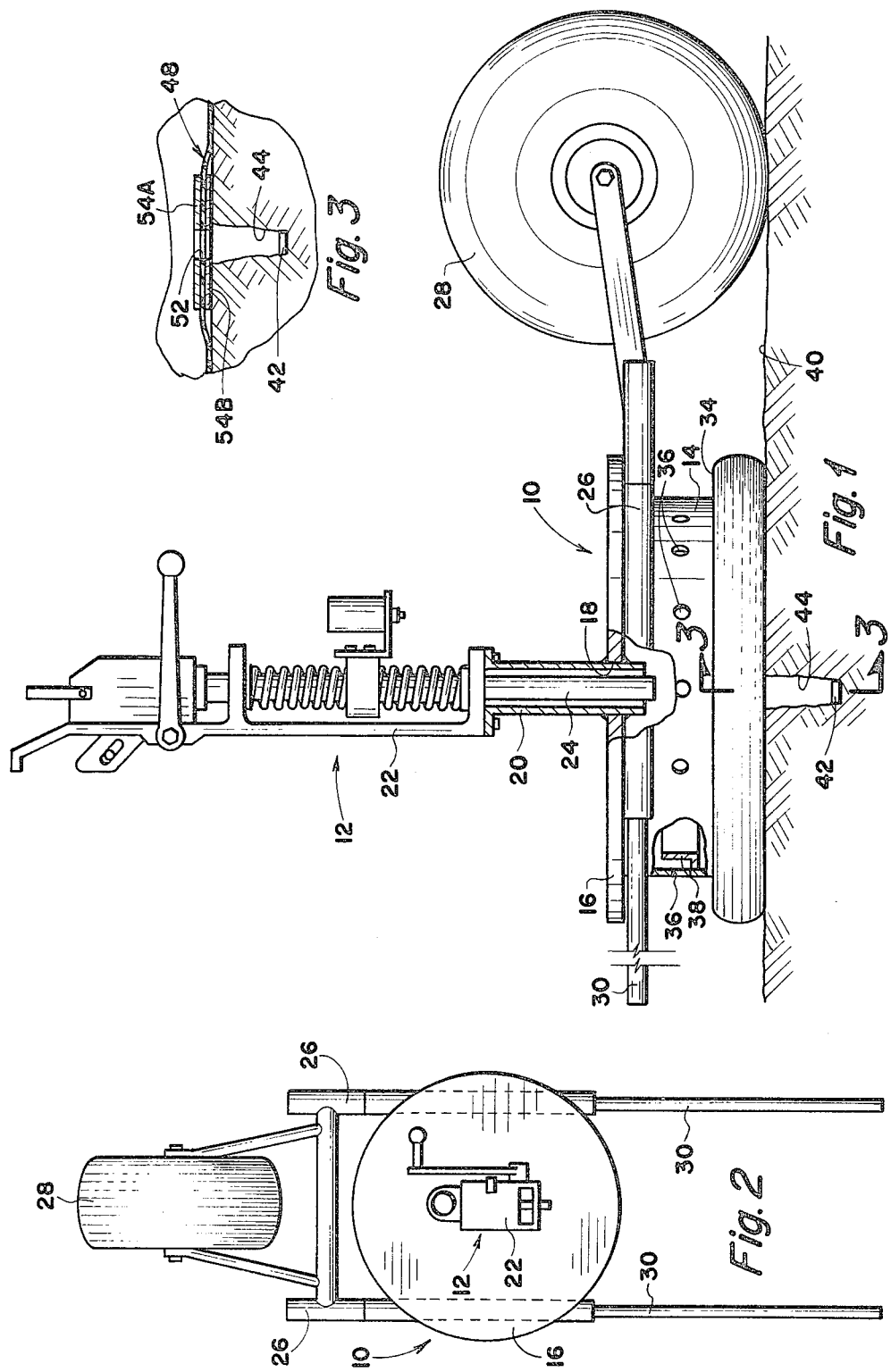

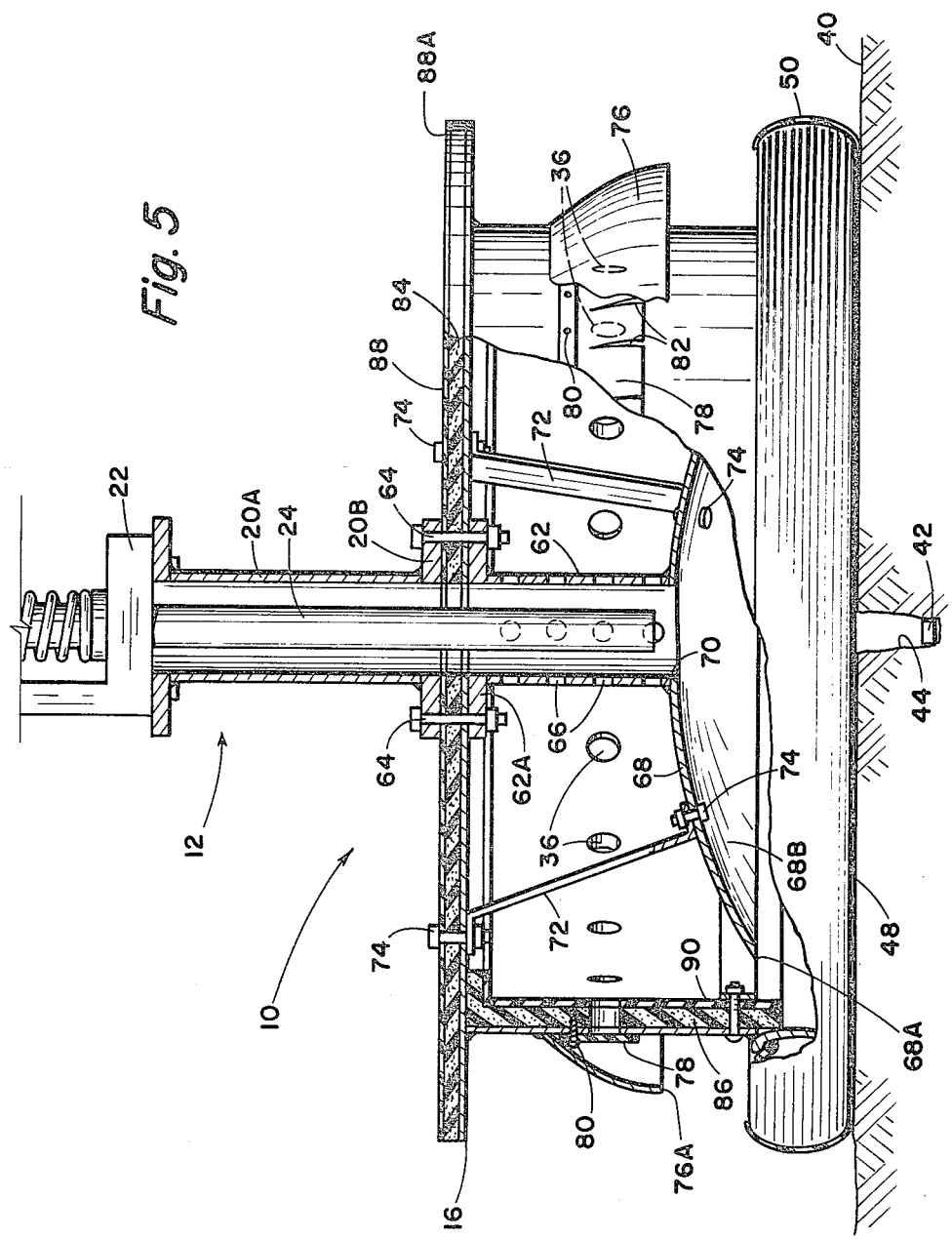

TRANSPORTER FOR LOW ENERGY SEISMIC SOURCE

CROSS-REFERENCE TO RELATED APPLICATION

This is a continuation-in-part of Application Ser. No. 963,982, entitled "LOW ENERGY SOURCE FOR SEISMIC OPERATION", filed Nov. 27, 1978 now U.S. Pat. No. 4,223,759.

BACKGROUND OF THE INVENTION

1. Field of the Invention

This invention relates to apparatus for generating seismic signals useful for geophysical mapping and exploration. The invention is particularly directed towards improvements in a low energy seismic signal generating device as revealed in the above-referenced Application Ser. No. 963,982, which is in the form of a base which supports a projectile firing gun. A seismic energy signal is generated in the earth when a projectile fired from the gun impacts in the earth's surface. The present invention is an improvement in this basic concept including the use of a spatter plate and diaphragm extending across the lower end of the base to keep the base free of impacted dirt and to contain and quiet the muzzle blast.

2. Description of the Prior Art

As is stated in more detail in Application Ser. No. 963,982, seismic energy signals for exploration purposes may be generated in a variety of ways, including the use of explosives, vibrating devices, and so forth. A unique improvement in the generation of seismic signals is introduced in the referenced patent application which describes an apparatus for firing a projectile into the earth's surface. The projectile firing seismic signal generating device has several advantages over previously known techniques, including economy, ease of movement from one place to another, reduced crew requirements, minimum space requirements, minimum disruption of the environment, and so forth.

The present invention is directed towards an improvement in the projectile fired seismic energy generating device by providing a means of intercepting objects, liquid and gas which are displaced from the surface of the earth as the projectile is fired into it. An advantage of the invention to be described is that it assists in muffling the sound of firing projectiles.

It is therefore an object of this invention to provide improvements in a portable low energy seismic source.

More particularly, an object of this invention is to provide an improvement in the transportable type of low energy seismic generating device employing a projectile firing gun mounted on a base, by providing means with the base for intercepting solid objects, liquids and gases which are displaced when a projectile is fired into the earth to prevent such material from being compacted against the interior of the base and to assist in muffling the sound of firing a projectile for seismic purposes.

Another object of this invention is to provide an improved base for a projectile firing gun for use in generating seismic signals, the base including an internal spatter plate and improved means of safely venting the gas as a projectile is fired.

These general objects as well as other and more specific objects will be fulfilled in the following description and claims, taken in conjunction with the attached drawings.

SUMMARY OF THE INVENTION

An improvement is provided in a portable seismic energy signal generating device. A unique type of apparatus for generating a seismic signal is that employing a base which rests upon the surface of the earth. Positioned on the base in a generally vertical manner is a projectile firing gun preferably of a size equivalent to about 8 gauge or greater. The base may include wheel means and a handlebar arrangement whereby it may be easily moved from one position to another on the earth; and when ready for generating a seismic signal, the base is rested on the earth and projectile fired into the earth. An important improvement is in the form of a flexible diaphragm affixed at its periphery to the base lower surface. The diaphragm has an opening therein through which the projectile fired from the gun passes. The diaphragm is arranged to engage the surface of the earth in the area surrounding the point of impact of the projectile and serves to assist in containing and muffling the blast as the projectile is fired. In addition, the diaphragm intercepts solids, liquids, and gases, displaced as the projectile impacts the earth's surface and prevents such "hole spatter" from traveling upwardly to compact and build up against the underside of the base. Such build-up adds considerable weight to the base and makes it more difficult and tiresome for workers to move the device from place to place.

In an alternate arrangement, reinforcing means of high strength material surrounding the hole is affixed to the diaphragm. The reinforcing means may include a plate attached to the top and bottom of the diaphragm around the opening therein. Other improvements include the provision of a spatter plate to intercept material displaced by the muzzle blast and improved means of venting the base.

DESCRIPTION OF THE DRAWINGS

FIG. 1 is an elevational view, shown partially cut away, of an embodiment of the improved portable seismic energy source of this invention.

FIG. 2 is a top view of the embodiment of FIG. 1.

FIG. 3 is a fragmentary cross-sectional view taken along the line 3—3 of FIG. 1.

FIG. 5 is a cross-sectional view of an alternate embodiment of the invention showing a spatter plate positioned within the base to intercept material dislodged by the muzzle blast and showing improved means of venting the gases generated by the muzzle blast.

DETAILED DESCRIPTION OF THE PREFERRED EMBODIMENT

Figure 1A:
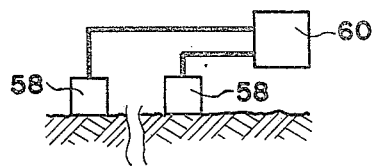
FIG. 1A is a diagrammatic view showing the use of geophones positioned on the earth to detect reflected seismic signals which are recorded.

Referring now to the drawings and first to FIG. 1, an embodiment of the invention is illustrated including a base generally indicated by the numeral 10 which supports a projectile firing gun 12. The base 10 includes a cylindrical sidewall 14. Affixed to the upper end of sidewall 14 is a top plate 16, having an opening 18 therein. Secured within the opening and to the top 16 is a tubular gun mount 20 which has, attached to the upper end thereof, the frame portion 22 of gun 12.

Extending downwardly from gun 12 is the muzzle or barrel 24 which is received within the tubular gun mount 20.

To provide means of easily transporting the seismic energy generating source over the earth, a tubular frame 26 supports a rotatably mounted wheel 28 at one end and handlebars 30 at the other.

The lower end of the cylindrical sidewall of the base is attached to the rim of a wheel of the type commonly utilized for vehicles, such as a motorcycle. Received on the periphery of the rim is a pneumatic tire 34.

The base cylindrical sidewall 14 has openings 36 therein to provide means for escape of gas generated when the projectile is fired by gun 12. To prevent physical objects from passing outwardly through openings 36, an internal shield 38 is welded around the internal periphery of the cylindrical sidewall 14.

In the previous embodiments of the invention such as illustrated in Application Ser. No. 963,982 previously referenced, the base rests upon the earth's surface 40 with the pneumatic tire 34 engaging the earth and supporting the frame and gun. When the gun is fired, a projectile 42 passes out of muzzle 24 and engages the earth, the fired projectile forming a hole 44 in the earth.

The apparatus described up to this point is essentially that which has been previously described in Application Ser. No. 963,982. It can be seen that when the projectile 42 engages the earth that the blast has a tendency to kick upwardly "hole spatter", including rocks, sand, dirt, vegetable matter, mud, water, snow, and so forth. This hole spatter is caused by two forces; that is, the projectile itself 42 and the gas passing out the end of muzzle 24. The provision of shield 38 within the interior of the frame helps prevent inadvertent discharge of physical objects away from the base, and the seal provided against the earth's surface by the pneumatic tire 34 also aids in improving the safety of the device. However, there is, nevertheless, a tendency for the displaced material or hole spatter to be discharged upwardly. When in soft material such as when conducting exploratory operations in areas that are muddy or where there is snow on the ground, or any other area where the soil tends to cling, the "hole spatter" impinges on the interior of the base; that is, specifically, upon the interior of the top plate 16 and the interior of sidewall 14. This accumulation adds significant weight to the apparatus, making it more difficult and tiresome to move about. In addition, the force of the blast of gases creates more noise than is desirable when uneven ground prevents full flush seating of the base chamber on the ground.

Figure 4:
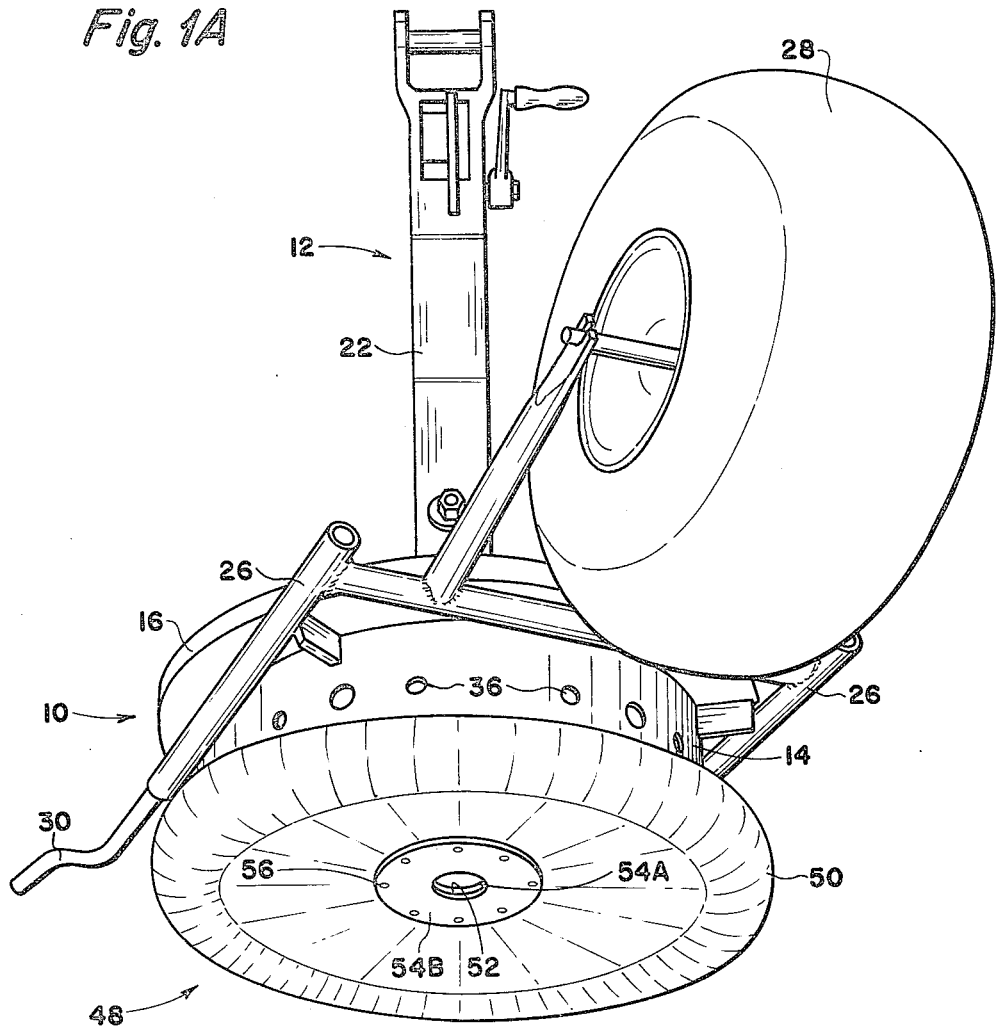
FIG. 4 is an isometric view of an embodiment of the invention showing the lower portion of the base with the diaphragm secured to the base.

The present invention solves these basic problems by providing, as best shown in FIGS. 3 and 4, a flexible diaphragm generally indicated by numeral 48. The diaphragm is attached at its outer periphery 50 to the base 10 lower peripheral edge. In the embodiment illustrated wherein a pneumatic tire 34 is employed, the diaphragm is preferably formed to have a contour at the outer peripheral surface 50 which stretches over tire 34 around the full perimeter thereof. In this way the diaphragm is easily attached or detached from the base and does not include any screws, bolts or otherwise which can be easily torn loose in operation.

The diaphragm 48 includes an opening 52 in the center thereof which is coincident with the axis of the gun muzzle 24. Projectiles fired by the gun pass through opening 52 and impinge on the earth directly below.

The diaphragm thus serves to surround the area of impact except for the small opening through which the projectile passes. Thus "hole spatter" and blast gases are confined by the diaphragm. This reduces the amount of materials from impinging upon and clinging to the frame interior surfaces and serves to muffle the sound of the gun firing. This reduces the noise level of the seismic signal source and thereby makes it more acceptable for use in seismic applications requiring short source to receiver distances and in areas around living quarters or any area where loud noises would be disagreeable.

The area around hole 52 in the diaphragm 48 is subjected to high level forces tending to tear the diaphragm. It has been found that the life of the diaphragm can be greatly increased by placing reinforcing 54A and 54B on the top and bottom surface of the diaphragm around the opening 52. Reinforcing 54A and 54B has an opening therein coincident with the diaphragm opening 52. The reinforcing pads may be in the form of metal or plastic, or the pads may be of elastomeric material. Any type material which helps resist the tendency of the diaphragm to tear when subjected to the high forces generated when a projectile is fired is acceptable. While a single reinforcing pad may be employed on either the upper or the lower surface of the diaphragm, it has been learned that a pad on the top and bottom surfaces is superior and the pads may be molded in the diaphragm during fabrication or may be secured together by bolts 56 or rivets extending through both the upper and lower reinforcing pads and the diaphragm. Pads 54A and 54B may be in the form of integral increased thickness portions as the diaphragm.

The illustrated arrangement is merely an exemplified embodiment of the invention. The basic concept is that of providing a flexible diaphragm secured to the lower peripheral edge of base 10. The base may not necessarily be cylindrical and may not include the use of a pneumatic tire mounted on a rim but may be of a variety of other configurations. Whatever the configuration of the base, the essence of the invention is the provision of a flexible diaphragm secured to or adjacent the lower peripheral edge of a base which supports a projectile firing apparatus thereabove, the purpose of the diaphragm being to intercept "hole spatter" and muffle the blast generated by firing a projectile. The illustrated arrangement wherein the diaphragm 48 is molded with the periphery 50 which slips over and is retained on the tire 34 has the advantage that no attachment means is required and hence the diaphragm can easily be removed and replaced when it becomes worn or if conditions exist where the surface of the earth and the location of use does not require the advantages achieved by the diaphragm.

FIG. 5 illustrates an embodiment of the base for the seismic energy source having additional improvements. This embodiment shows the base 10 and gun 12 but without handlebars and a wheel or other means to move the base about, it being understood that such means would be employed similar to that shown in FIG. 1. The gun mount 20 has a lower flange 20B. Positioned below top plate 16 is a vertically extending cylinder 62 having a flange 62A at the upper end thereof. Cylinder 62 is in axial alignment with gun mount 20, and flanges 20A and 62A are affixed to top plate 16 by bolts 64. Cylinder 62 is perforated by openings 66 and coaxially receives the gun muzzle 24. Affixed to the lower end of cylinder 62, such as by welding, is a spatter plate 68. A hole 70 is provided in the spatter plate coincident with the tubular opening of cylinder 62. While the spatter plate 68 may be flat, it preferably has a concave lower surface 68B, as illustrated. The outside diameter 68A of the spatter plate is less than the inside diameter of the base cylindrical wall 14. A plurality of struts 72 (preferably three or more) extend from the top plate 16 to the spatter plate and are attached at each end by bolts 74.

Spatter plate 68 provides two important functions. First, which is particularly important when used without diaphragm 48, it intercepts gases, liquids, and solids which are projected upwardly when projectile 42 is fired into the earth. This prevents such material from clinging and compacting against the interior of the base sidewall 14 and top plate 16. Obviously, material clinging to the spatter plate 68 is much more readily removed than if it is compacted against the entire base interior. A second important function, when the spatter plate is used in conjunction with diaphragm 48, is that it limits the upward travel of the diaphragm. When a projectile is fired compressed gases from the blast follow the projectile 42 into the hole 44 formed by the projectile, and these gases pass back out of the hole as they expand. Such expanding gas, coupled with dirt, rocks, mud, water, etc. which are displaced by the projectile, tend to force the diaphragm upwardly, and this upward travel is limited by the close proximity of the spatter plate. At the same time, the space between the spatter plate and the diaphragm permits blast gases to escape for ultimate discharge out of the base through openings 36 in the sidewall 14.

A second improvement illustrated in FIG. 5 is the use of a deflection skirt 76 on the exterior of base sidewall 14. This skirt is attached around the exterior periphery of the base sidewall 16 above openings 36 and extends outwardly and downwardly around the base. The lower peripheral edge 76A of the deflection skirt is of diameter greater than the exterior diameter of the base sidewall 14 and below openings 36 so as to readily permit blast gases to pass out through openings 36 but to direct downwardly towards the earth's surface 40 any liquid or solid material. Thus, the deflection skirt 76 provides essentially the same service as the shield 38 of FIG. 1.

A third improvement illustrated in FIG. 5 is the use of flexible flaps 78 affixed to the base sidewall 14 covering each opening 36. Flaps 78, formed of elastomeric material, normally extend parallel to and contiguous the sidewall 14 but are deflected outwardly by gas pressure within the base to allow blast gases to be vented. The flaps serve to further ensure that any solid material passing out openings 36 is deflected downwardly. Further, the resiliency of the flaps absorb kinetic energy from flying solid objects to reduce the velocity thereof and thus improve the safety of the device.

Flaps 78 may be individually formed and attached over each opening 36 by screws 80, or as illustrated, the flaps may be in the form of a long, narrow length of elastomeric material, slit part way from the bottom edge to the top edge, with the top edge of the strip being held by screws 80, there being a slit 82 between each opening 36. A further benefit of flaps 78 is that they help muffle and quiet the blast noise.

A fourth improvement shown in FIG. 5 is the use of sound insulating material 84 on the top plate 16 and insulation material 86 on the interior of sidewall 14. While insulation 84 may be placed on the interior of top plate 16, it is preferably placed on the exterior top surface as illustrated, since it also serves to form a cushion for the feet of the operator if he chooses to stand on the top when the gun is fired.

Insulation 84 and 86 may be of any material which absorbs sound, such as sponge or foam rubber, foam plastic, or the like. A preferred arrangement is shown in which a relatively thin layer of tough non-metallic cover sheet 88, such as natural or synthetic rubber or plastic, is bonded to the upper surface of insulation 84. Insulation material 84 may, by way of example, be from about ⅜" to 1" thick, and cover sheet 88 of about 1/16" to 3/16" thickness. The cover sheet 88 is preferably of the type providing a non-slip surface 88A.

Insulation 86 also preferably has an inner covering 90 of tough, non-metallic material, such as synthetic rubber or plastic, with insulation 86 being about ⅜" to 1" thick and covering 90 being about 1/16" to 3/16" thick.

While the invention has been described with a great degree of particularity, it is manifest that many changes may be made in the details of construction and the arrangement components without departing from the spirit and scope of this disclosure. It is understood that the invention is not limited to the embodiments set forth herein for purposes of exemplification, but is to be limited only by the scope of the attached claim or claims including the full range of equivalency to which each element thereof is entitled.

What is claimed is:

1. An improved seismic energy source comprising:
    a base having an opening therethrough and having a lower and upper end;
    a gun mounted on said base upper end for firing a projectile to impact the earth's surface and generate a seismic signal; and
    a flexible diaphragm affixed at its periphery to said base lower end, the diaphragm having an opening through which projectiles fired by said gun pass, the diaphragm serving to intercept material dislodged from the earth when a projectile is fired.

2. An improved portable seismic energy source according to claim 1 wherein said base has a peripheral wall and said diaphragm is attached to the peripheral wall's lower end.

3. An improved portable seismic energy source according to claim 1 including
    an upper horizontal plate means affixed to the upper end of said base, the plate means having an opening therein, said gun being supported on said plate means and positioned so that projectiles fired thereby pass through the plate opening.

4. An improved portable seismic energy source according to claim 1 including:
    a horizontal cylindrical elastomeric means affixed to said base lower end, said diaphragm being affixed at its periphery to the elastomeric means.

5. An improved portable seismic energy source according to claim 4 wherein said elastomeric means is in the form of a pneumatic tire mounted on a rim.

6. An improved portable seismic energy source according to claim 1 including:
    a reinforcing plate of external dimensions less than said diaphragm, the plate having an opening therethrough, the plate being affixed to said diaphragm so that the opening coincides with the diaphragm opening.

7. An improved portable seismic energy source according to claim 1 including:
    an upper end and a lower reinforcing plate each of external dimensions less than said diaphragm, each plate having an opening therein, the plates being affixed to the upper and lower surfaces of said diaphragm so that the openings coincide.

8. An improved portable seismic energy source according to claim 1 including:
sound absorbing insulation applied to said base.

9. An improved portable seismic energy source according to claim 1 including:
a spatter plate positioned within said base intermediate said upper and lower ends, the spatter plate having an opening therein through which projectiles from said gun pass, the spatter plate being spaced above said diaphragm.

10. An improved portable seismic energy source according to claim 9 in which said spatter plate has a concave lower surface.

11. An improved seismic energy source comprising:
a base having a sidewall providing an upper and a lower end;
a gun mounted on said base upper end having a muzzle from which a projectile may be fired to impact the earth's surface and generate a seismic signal;
a spatter plate having an opening therethrough, supported within said base sidewall intermediate said top and bottom end, the opening being aligned with said gun muzzle, whereby projectiles from said gun pass through the spatter plate, the spatter plate serving to intercept at least some of the gases, liquids, and solids ejected when projectiles engage the earth.

12. An improved seismic energy source according to claim 11 in which said spatter plate has a concave lower surface.

13. An improved seismic energy source according to claim 11 in which said base has
a horizontal top plate affixed to said sidewall upper end, the top plate having an opening therein, said gun being supported on the top plate with said muzzle in alignment with said opening, and including:
a vertical tubular cylinder secured at its upper end to said base lower surface with the tubular opening in alignment with said top plate opening, said spatter plate being secured to the cylinder bottom end with said spatter plate opening in alignment with said cylinder tubular opening.

14. An improved seismic energy source according to claim 13 in which said tubular cylinder has a plurality of openings in the sidewall thereof.

15. An improved seismic energy source according to claim 13 including:
a plurality of struts extending from said spatter plate upper surface to the lower surface of said top plate.

16. An improved seismic energy source according to claim 11 including:
sound absorbing insulation applied to said base.

17. An improved seismic energy source comprising:
a base having a sidewall providing an upper and a lower end, the base sidewall having a plurality of spaced apart openings therein;
a top plate affixed to said sidewall upper end, the top plate having an opening therein;
a gun mounted on said base upper end having a muzzle from which projectiles may be fired to impact the earth's surface and generate a seismic signal, the muzzle of the gun being in alignment with said top plate opening, at least some of the blast gas when a projectile is fired passing out of said base through said sidewall openings; and
a circumferential deflection skirt positioned on the exterior of said base sidewall, the upper end of the skirt being secured to the sidewall exterior surface above said sidewall openings, the lower end of the skirt being spaced away from said sidewall exterior surface and below said sidewall openings, gases passing out said sidewall openings being vented downwardly by said deflection skirt.

18. An improved seismic energy source according to claim 17 including:
a flap of flexible material having the upper end secured to said base sidewall exterior surface above each said sidewall opening, each flap normally extending vertically downwardly to cover its companion opening and being deflected outwardly by the passageway of gas outwardly through said sidewall openings.

19. An improved seismic energy source according to claim 18 wherein said flap of flexible material secured to said sidewall covering said openings in said sidewall is in the form of an elongated strip of flexible material having a top end and a bottom end, the top end being secured to said sidewall exterior surface whereby each said sidewall opening is covered, and a slit from said strip bottom end to adjacent said top end between each said sidewall openings.

20. An improved seismic energy source according to claim 17 including:
sound absorbing insulation applied to said base sidewall and to said top plate.

* * * * *